United States Patent

Lovitz

[15] 3,635,344
[45] Jan. 18, 1972

[54] UNITARY FILTER AND PUMP FOR HOME AQUARIUMS

[72] Inventor: David D. Lovitz, Short Hills, N.J.
[73] Assignee: Sternco Industries, Inc., Harrison, N.J.
[22] Filed: Aug. 21, 1970
[21] Appl. No.: 65,810

[52] U.S. Cl. .................................................210/169, 119/5
[51] Int. Cl. ....................................E04h 3/20, A01k 64/00
[58] Field of Search........................................119/5; 210/169

[56] References Cited

UNITED STATES PATENTS

| | | | |
|---|---|---|---|
| 3,511,376 | 5/1970 | Sesholtz.................................. | 210/169 |
| 2,275,428 | 3/1942 | Haldeman.............................. | 210/169 |

Primary Examiner—Charles N. Hart
Attorney—Emanuel R. Posnack

[57] ABSTRACT

A combination filter and motorized pump for mounting on the wall of an aquarium. A housing containing a removable filter tank and electric heater is connected by an upper casing to a screw-type of water elevator adapted for positioning within the aquarium, the said housing being positionable outside of the aquarium wall. The top of said casing comprises a platform supporting an electric motor, the said screw elevator extending up through the floor of the casing and being connected by shafting to said motor. A deflector disc is mounted on said shafting for deflecting water downwardly to protect the motor and direct the water to the casing floor from which it flows downwardly through the filtering and heating compartments of the housing, and then upwardly through lateral passageways to correspondingly positioned spillways, the latter being integral with hook members supporting the device on the rim of the aquarium.

10 Claims, 8 Drawing Figures

PATENTED JAN 18 1972
3,635,344
SHEET 1 OF 3
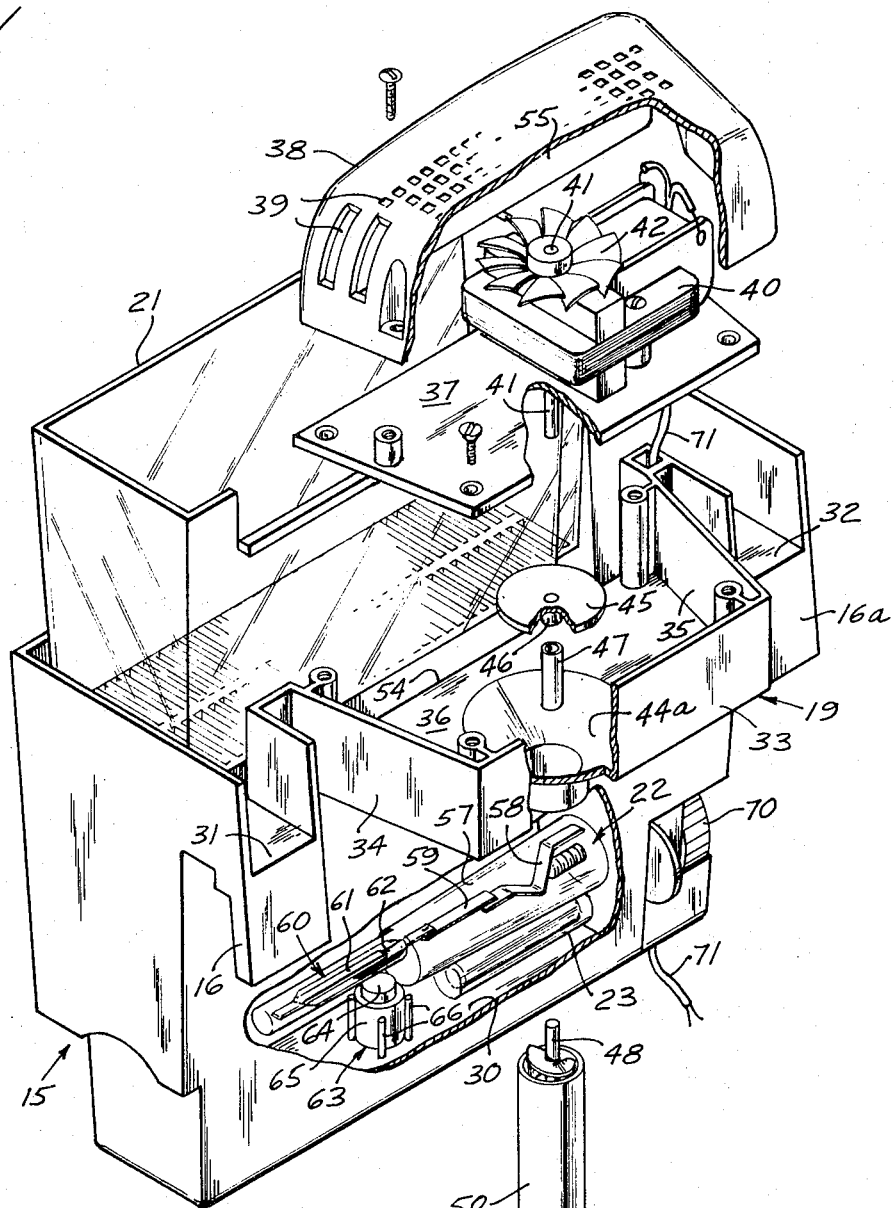
FIG. 1
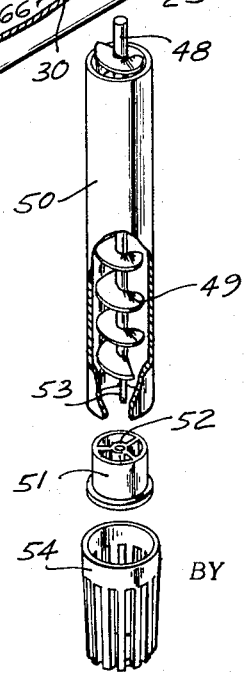
INVENTOR.
DAVID D. LOVITZ
BY
E.R. Poznak
ATTORNEY

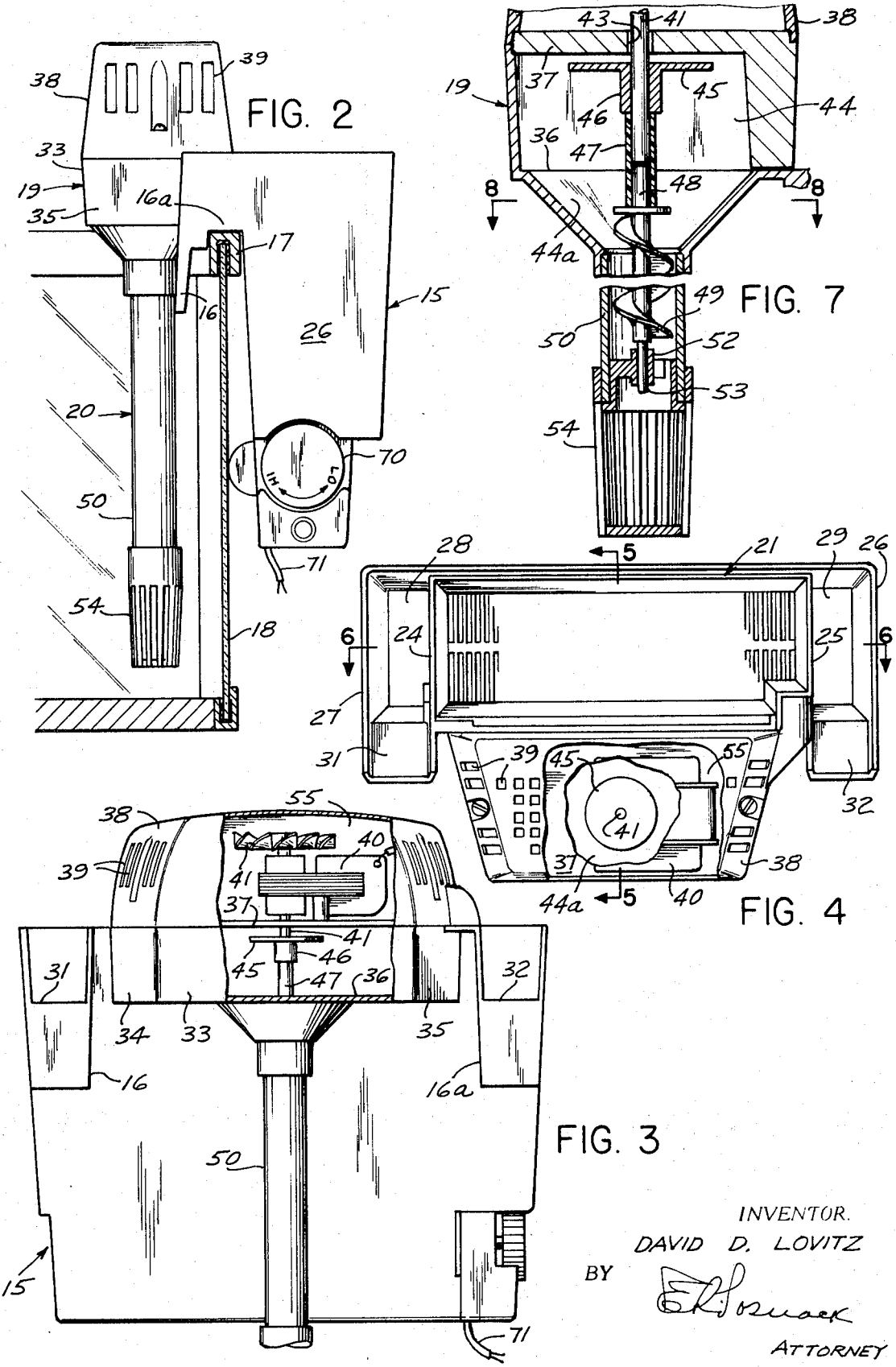

PATENTED JAN 18 1972

INVENTOR
DAVID D. LOVITZ
BY
ATTORNEY 3,635,344

UNITARY FILTER AND PUMP FOR HOME AQUARIUMS

BACKGROUND OF THE INVENTION

1. The Field of the Invention

This invention relates to filters for home aquarium tanks—more particularly to a combined outside filter and pumping means adapted for direct attachment to an aquarium wall.

2. The Prior Art

Most aquarium filter devices of the above-mentioned class are positioned within an aquarium tank, requiring the removal of the entire device for cleaning or replacing the filter element; and some such devices, like the filter heater device described in U.S. Pat. No. 3,511,376, are mounted on the wall of the aquarium in an exterior position. Both types of said devices are generally connected by tubing to separate pumping means, requiring a suitable surface adjacent the tank to accommodate the pumping apparatus. Such devices have accordingly often been found unsatisfactory as requiring special and at times messy handling and as being uneconomical of space.

OBJECTS OF THE INVENTION

It is the objective of this invention to provide a device of the said category having none of the aforesaid shortcomings—one having a unitary construction comprising pumping, filtering and means adapted for convenient attachment to the wall of an aquarium. Specifically, among the objects of this invention are the provision of the following: a combination water elevator and filter device in which the water elevator and the filter components are positionable on opposite sides of an aquarium wall; space economical water-elevating means; a water protected motor operatively connected to the water elevator; a filter device having coactive electric heating means; means conveniently to mount the entire unitary device on a selected portion of an aquarium wall, said mounting means serving also as a short return water spillway; and removable exterior filtering means and accessible heating means.

Other objects, features and advantages will appear from the drawings and the description hereinafter given.

SUMMARY OF THE INVENTION

In the preferred form of this invention, a housing containing therein a removable filter tank and electric heating means therebelow is disposed in spaced relation to a screw type of water elevator positioned within an elongated riser tube, the upper portions of said elevator and housing being connected by a casing positioned for overlying relation to the wall of an aquarium, the said housing having laterally opposite support members flanking said housing and adapted for mounting upon the said aquarium wall. When the device is operatively mounted on an aquarium wall, the said water elevator component will be immersed in the aquarium water and the said housing will be disposed on the outside of the aquarium.

The said casing has a floor through which the top of said screw elevator extends and an upper platform supporting a covered electric motor, said motor and screw elevator being operatively connected by shafting upon which is fixedly mounted a deflector disc, said disc being disposed at the upper portion of the casing chamber for deflecting upwardly pumped water downwardly away from the motor compartment and towards said floor. The said floor has its forward edge positioned above said filter tank, the arrangement being such that water drawn upwardly by said screw elevator and deposited on said floor will flow over said forward edge and into the said filter tank.

Water flowing down through said filter tank engages a thermostatically controlled electric heater, after which the filtered and heated water flows upwardly through two laterally opposite passageways in the housing to two respective spillways connecting said housing and the aquarium, thereby to direct the water back into the aquarium. The said spillways are at the top of and preferably integral with the said support members, whereby the latter elements serve both as mounting means for the device and return water spillways.

DESCRIPTION OF THE DRAWINGS

FIG. 1 is an exploded perspective view of the device of this invention, portions being broken away for clarity and compactness.

FIG. 2 is a side elevation of said device shown mounted on an aquarium of which a fragment is shown.

FIG. 3 is a rear elevation of said device, with a portion broken away fro clarity.

FIG. 4 is a plan view of the device, with a portion broken away for clarity.

FIG. 7 is an enlarged fragmentary section showing a portion of FIG. 5.

DESCRIPTION OF PREFERRED EMBODIMENT

Figure 5:
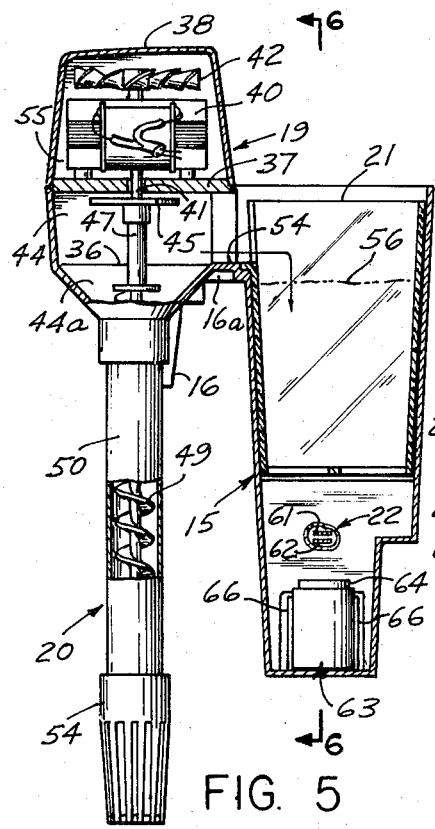
FIG. 5 is a section of FIG. 4 taken along line 5—5.

In the illustrated embodiment of this invention, the housing 15 has two rear laterally opposite support members shown as hook portions 16 and 16a adapted for mounting over the rim 17 of an aquarium 18 (see FIG. 2), there being a casing 19 between said hook portions and extending rearwardly from the body of said housing in overhanging relation to said aquarium and supporting the tube-encased screw-type water elevator 20 in spaced relation to the body of said housing 15 and extending down for operative immersion within the water of the said aquarium, said housing 15 being adapted for positioning outside of said aquarium.

The said housing 15 contains at the upper portion thereof the removable filter tank 21; and directly below said tank is the thermostat float switch generally designated 22 below which is the electric heating member 23, members 22 and 23 being substantially like the corresponding elements described in said U.S. Pat. No. 3,511,376.

The laterally opposite walls 24 and 25 of said filter tank 21 are spaced from the respective laterally opposite walls 26 and 27 of the housing 21 thereby forming two laterally opposite outlet passageways 28 and 29 communicating with the bottom compartment 30 containing the said thermostat 22 and heating means 23. Disposed over said hook portions 16 and 16a are the respective channel-shaped spillways 31 and 32 communicating with said respective passageways 28 and 29, said hook portions being in effect bridges between the water elevator 20 and the filter and heater housing 15.

The said casing 19 is defined by the rear wall 33, the sidewalls 34 and 35, the floor 36 and the top platform 37, there being a cover 38 with ventilating apertures 39 in the side and top walls thereof. Mounted upon said platform 37 is the electric motor 40 having shaft 41 to the upper portion of which is attached the fan 42 positioned between the said motor and the top of said cover 38. The said motor shaft 41 extends down through the aperture 43 of the said platform 37 into the chamber 44 constituting the interior of the said casing 19. Fixedly mounted over said motor shaft 41 is the water deflector disc 45 with its hub 46, the said motor shaft protruding downwardly therefrom. Frictionally mounted over said protruding portion of the motor shaft is one end portion of the flexible tubular connector 47, the other end portion thereof being frictionally mounted over the upwardly extending shaft 48 of the screw water-elevating member 49 operatively disposed within the cylindrical riser tube 50. The bottom of said latter tube has a bushing 51 with a thrust bearing 52 therein in operative engagement with the bottom shaft portion 53 of the said screw member 49, thereby rotatably to support said screw member within the tube 50. The arrangement is hence such that upon an operative rotation of the motor 40, both the said deflector disc 45 and the screw member 49 will be operatively rotated, water being drawn upwardly through said tube 50 into the chamber 44 of the casing 19. In the embodiment illustrated, the bottom of the tube 50 is provided with screen member 54 for keeping impurities from being pumped into said casing 19.

Extending down from said floor 36 of the casing 19 is an enlarged conical chamber 44a, the upper portion of the said screw member 49 extending partly into said chamber, the flared wall of said chamber receiving part of the upwardly moving column of water and helping to spread it upon the said floor 36. The said disc 45, which is placed in close proximity to the underside of the motor-supporting platform 37, will deflect any water reaching its level, thereby not only keeping the water from entering the motor compartment 55 within the cover 38, but also deflecting such water downwardly upon the said floor 36.

Figure 6:
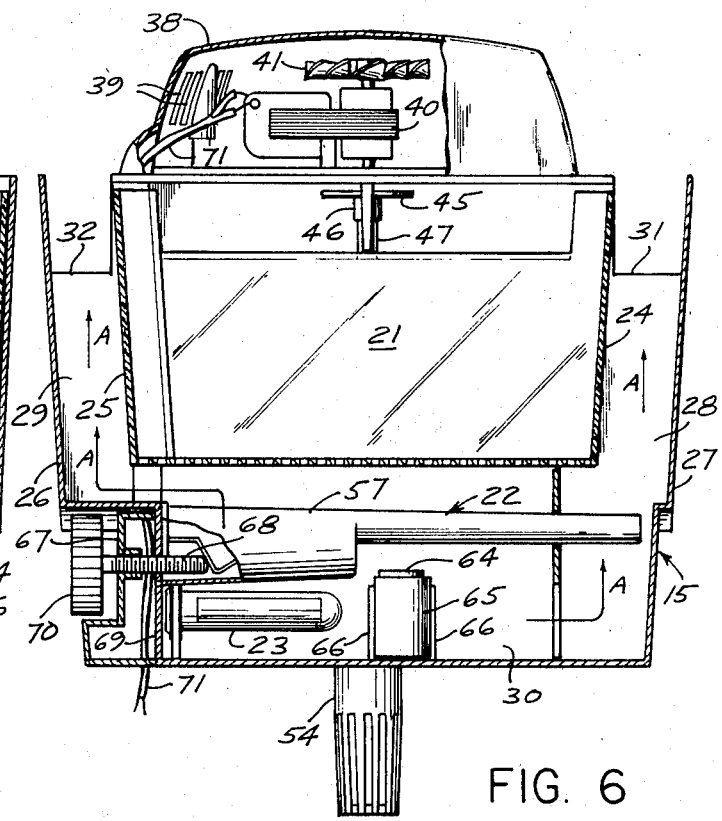
FIG. 6 is a section of FIG. 5 taken substantially along line 6—6, portions being shown in elevation.
Figure 8:
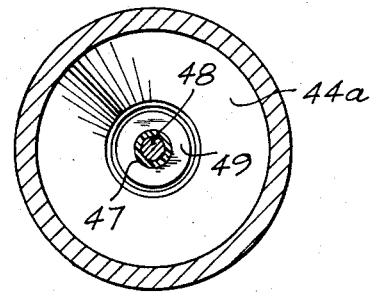
FIG. 8 is a fragmentary section of FIG. 7 taken substantially along line 8—8.

In the above-described operation, the water on the said floor 36 will flow over the front edge 54 into the filter tank 21, through the filter material 56, through the bottom tank apertures 21a into the said bottom compartment 30 for operative engagement with the said heating member 23, whereafter the filtered and heated water will, following the arrows A (FIG. 6), flow upwardly through the said outlet passageways 28 and 29, over the said spillways 31 and 32, and back into the aquarium.

The said heating member 23 is of conventional construction with an electric heating element (not shown) operatively connected to a source of current supply and the said thermostat float switch 22. Said switch and heating member are disposed directly below the filter tank 21, so as to be directly in the path of the filtered water flowing downwardly from the tank. The casing 57 of said switch 22 contains the angular spring-loaded thermostat contact arm 58 electrically connected to a line contact terminal (not shown), said arm 58 being in coactive relation to the bimetallic element 59 electrically connected to the conventional magnetic reed switch generally designated 60, having the normally disengaged contact arms 61 and 62. Positioned underneath said magnetic reed switch 60 is the magnetic float member 63 having at the top thereof the magnetic element 64 mounted on the casing 65 which contains suitable light flotation material (not shown), said casing 65 being slidably positioned within the vertical guides 66, the arrangement being such as to permit vertical floating movements of the casing. The said magnetic element 64 is so positioned and proportioned as to be in operative adjacent relation to said contact arms 61 and 62 of the reed switch 60 when the float casing 63 is elevated at predetermined levels of water within the housing 15, and is in nonoperative relation to said contact arms at low levels of said water. The said contact arms 61 and 62 are normally yieldably separated and are adapted to be brought into mutual contact under the magnetic influence of said magnetic element 64, in known manner.

Extending through the recessed wall 67 at the bottom of the housing 15 is the adjusting screw shank 68 in threaded engagement with the wall 69 and extending into the interior of the thermostat switch casing 57, the outer terminal of said shank carrying the knob 70, the inner terminal being in adjustable engagement with the said angular spring-loaded contact arm 58, in a manner known to those skilled in the art. For the purpose of this specification it is merely necessary to note that at a predetermined temperature the said normally disengaged bimetallic contact arm 59 will become operatively bent a sufficient amount to cause it to come into engagement with the angular coactive contact arm 58 to close the heater circuit if the magnetic reed contact arms 61 to 62 are in operative engagement, such engagement being effected when the said magnetic element 64 is at an upper operative level.

The construction above described is such as to enable the entire unit to be quickly and effectively applied to an aquarium without the use of any separate pumping means, the only outside connection being the wire 71 for attachment to a wall outlet. The tubular water elevating means 20 is spaced from the filter and heater housing 15, the spillways 31 and 32 formed by the two hook portions 16 and 16a bridging the gap, the air-cooled motor compartment 55 overlying the compartment 44 into which the aquarium water to be filtered and heated is drawn. The motor 40 is operatively connected to the screw member 49 for a direct drive, yet is protected from the upwardly pumped water by the deflector disc 45. The filter tank 21, being disposed outside of the aquarium, can be removed without detaching the entire device from the aquarium; and since the heating unit 23 and thermostat 22 are contained in the exterior housing 15, they are readily accessible for adjustment, repair or replacement.

Although the above-described preferred embodiment includes the thermostat control 22 and heating unit 23, it is understood that this invention, in certain aspects thereof, is operative without such heating means, that is, is fully operative with the combination of the tubular water lifting means 20, the housing 15 with said filter tank 21, the casing 19 with its floor 36, platform 37, motor 40 and associated parts.

In the above description, the invention has been disclosed merely by way of example and in preferred manner; but obviously many variations and modifications may be made therein. It is to be understood, therefore, that the invention is not limited to any particular form or manner of practicing same.

I claim:

1. A unitary filter and pump for home aquariums having a housing, a filter tank within the housing, a water outlet passageway within the housing communicating with said filter tank, a support member at the upper portion of said housing for mounting on the rim of an aquarium, a casing adjacent said support member and joined to said housing, said casing having a floor, a platform above said floor, tubular water-lifting means comprising a screw water elevator and a riser tube encasing said elevator, said screw elevator extending through said floor of said casing, an electric motor mounted on said platform, shafting operatively connecting said motor and said screw elevator, said floor having a portion thereof disposed above said filter tank and in communication therewith, whereby water operatively pumped upwardly by said screw elevator will be deposited on said floor to gravitationally flow into said filter tank, and a return water spillway in the upper region of said housing and in communication with said water passageway for returning the filtered water in said passageway to an operatively positioned aquarium.

2. A unitary filter and pump according to claim 1, said portion of said floor disposed over said filter tank comprising an edge on the front of the floor, whereby water operatively deposited on said floor will flow over said edge downwardly into said filter tank.

3. A unitary filter and pump according to claim 1, said floor having a chamber with a downwardly and inwardly flared wall portion connected to the top of said riser tube, for spreading upwardly pumped water along said floor.

4. A unitary filter and pump according to claim 1, said shafting having fixedly mounted thereon a deflector disc spaced above said floor, for deflecting upwardly directed water downwardly away from said motor and towards said floor.

5. A unitary filter and pump according to claim 4, said shafting having a portion thereof below said disc made of flexible material.

6. A unitary filter and pump according to claim 4, said casing having a lateral wall portion joined with said floor and platform to define the interior of said casing, said disc being disposed within said casing interior and adjacent said platform.

7. A unitary filter and pump according to claim 1, said platform having mounted thereupon an apertured cover enclosing said motor.

8. A unitary filter and pump according to claim 1, said support member being laterally adjacent said casing, said spillway being disposed over and being integral with said support member.

9. A unitary filter and pump according to claim 1, said housing having a compartment below said filter tank, an electric heating unit disposed in said compartment, said filter tank communicating with said compartment, whereby filtered water from the tank will operatively come into engagement with said heating unit, said compartment being in communication with said water outlet passageway.

10. A unitary filter and pump according to claim 1, said housing having a second support member at its upper portion, said support members being in flanking relation to said casing, said housing having a second spillway and a second water outlet passageway, said latter spillway being disposed over and being integral with said second support member and being in communication with said second outlet passageway, said casing having therein a deflector disc spaced above said floor and below said platform, for deflecting upwardly directed water downwardly away from said motor and towards said floor, and means for rotatably activating said disc.

* * * * *